No. 697,631.  
E. KING.  
FARM GATE.  
(Application filed June 29, 1901.)  
Patented Apr. 15, 1902.

(No Model.) 2 Sheets—Sheet 1.

Witnesses  
Jos. H. Blackwood

Inventor  
Elias King  
by T. A. Gowrie  
Attorney

THE NORRIS PETERS CO., PHOTO-LITHO., WASHINGTON, D. C.

No. 697,631. Patented Apr. 15, 1902.
E. KING.
FARM GATE.
(Application filed June 29, 1901.)
(No Model.) 2 Sheets—Sheet 2.
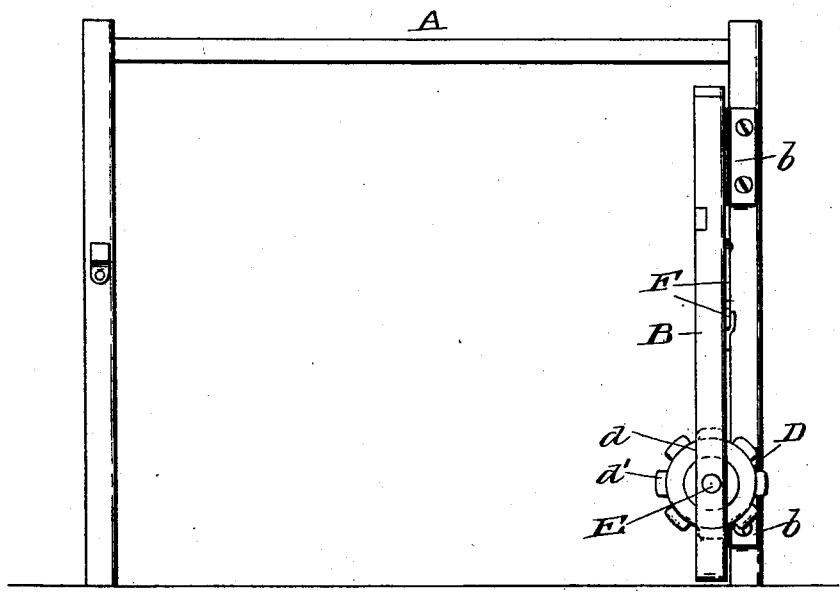
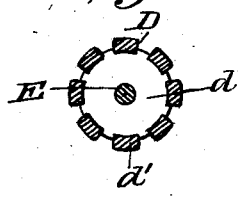

UNITED STATES PATENT OFFICE.

ELIAS KING, OF NEMAHA, IOWA.

FARM-GATE.

SPECIFICATION forming part of Letters Patent No. 697,631, dated April 15, 1902.

Application filed June 29, 1901. Serial No. 66,591. (No model.)

*To all whom it may concern:*

Be it known that I, ELIAS KING, of Nemaha, in the county of Sac and State of Iowa, have invented certain new and useful Improvements in Farm-Gates, of which the following is a specification.

Figure 1:
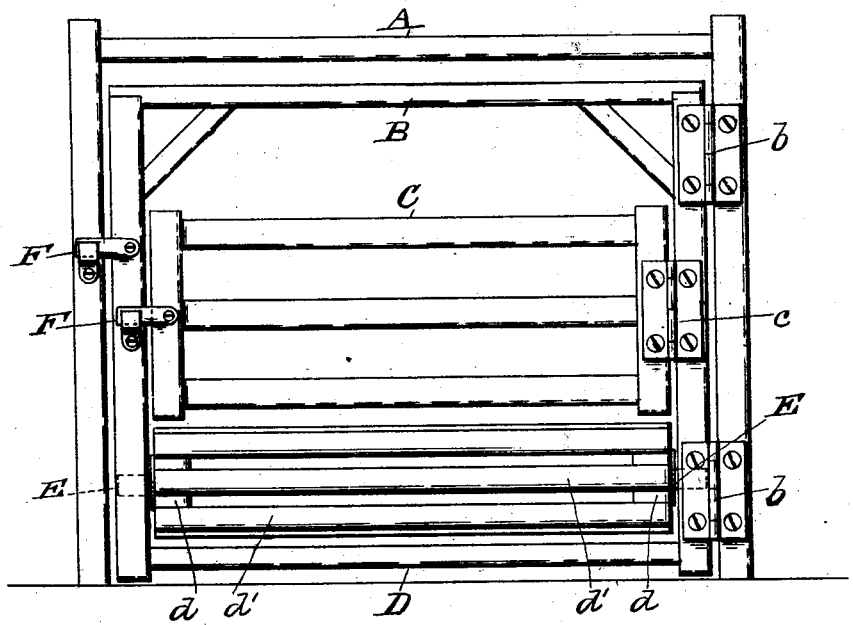
Figure 2:
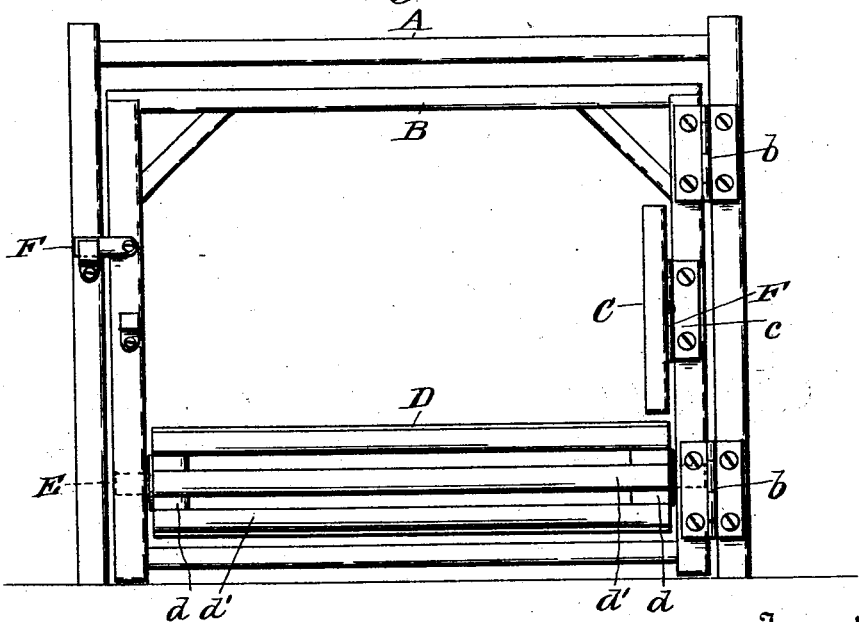

My invention relates to gates to be used on farms, in stock-yards, &c., and has for its object to provide a gate with means to allow the passage of large stock—such as cows, horses, &c.—and prevent the passage of swine, sheep, and other small stock, if desired, and that can be opened to allow the passage of both large and small stock when desired.
In the drawings, Figure 1 is a front elevation of my gate closed. Fig. 2, a similar view, the cattle-gate being open; Fig. 3, a view with gate open for the passage of all sizes of stock; Fig. 4, a transverse sectional view of the roller.

In the drawings, in which similar letters of reference indicate like parts throughout the several views, A represents the main framework of the gate, B a secondary framework hinged thereto at $b\ b$, and C a gate hinged to said secondary framework B at $c\ c$.

D represents a roller revolving on a rod E, said roller D being made up of the end pieces $d$ and slats $d'$.
F F represent latches of any suitable construction.

The operation is as follows: To prevent stock from going through the gate, it is closed, as shown in Fig. 1. If it is desired to allow large stock to go through, the gate C only is opened, as shown in Fig. 2. This will leave the roller D across the gate. Cows, horses, &c., can readily jump over the roller, but hogs, sheep, calves, &c., will be thrown back when they attempt to follow the larger stock, the slats on the roller tending to insure the revolution thereof. When it is desired to permit the passage of large and small stock, the framework B is turned on the hinges $b\ b$, as shown in Fig. 3.

Having thus described my invention, what I claim is—

1. In a gate, a framework hinged to any suitable support, a roller mounted in said framework, and a gate hinged to the framework, substantially as shown and described.

2. In a gate, a framework hinged to any suitable support, a slatted roller mounted in said framework, and a gate hinged to the framework, substantially as shown and described.

3. In a gate, a framework hinged to any suitable support, a slatted roller mounted in said framework, said roller comprising circular end pieces and slats secured to the periphery of said end pieces, and a gate hinged to the framework, substantially as shown and described.

4. In a gate, a framework hinged to one post thereof, a rod connecting the side bars of said framework, circular disks loosely mounted on said rod, slats secured to the periphery of said disks, and a gate hinged to one of the side bars of said framework, substantially as shown and described.

In testimony whereof I hereto affix my signature in the presence of two witnesses.

ELIAS KING.

Witnesses:
CHARLES D. GOLDSMITH,
A. W. McCORD.